United States Patent [19]

Mead

[11] 4,312,561

[45] Jan. 26, 1982

[54] OPTICAL FIBRE SWITCHES

[75] Inventor: John F. Mead, Princes Risboro, England

[73] Assignee: Plessey Handel und Investments A.G., Zug, Switzerland

[21] Appl. No.: 83,864

[22] Filed: Oct. 11, 1979

[30] Foreign Application Priority Data

Oct. 14, 1978 [GB] United Kingdom ............ 40862/78

[51] Int. Cl.³ ............................................. G02B 5/14
[52] U.S. Cl. ................................. 350/96.21; 350/96.16
[58] Field of Search ............... 350/96.15, 96.16, 96.20, 350/96.21, 96.22

[56] References Cited

U.S. PATENT DOCUMENTS

| 4,212,513 | 7/1980 | Gravel | 350/96.15 |
| 4,220,396 | 9/1980 | Antell | 350/96.15 |

FOREIGN PATENT DOCUMENTS

| 1946693 | 8/1970 | Fed. Rep. of Germany | 350/96.20 |
| 2016498 | 10/1971 | Fed. Rep. of Germany | 350/96.20 |
| 2704984 | 8/1978 | Fed. Rep. of Germany | 350/96.20 |
| 1236561 | 6/1971 | United Kingdom. | |
| 1250556 | 10/1971 | United Kingdom. | |
| 1257794 | 12/1971 | United Kingdom. | |
| 1312516 | 4/1973 | United Kingdom. | |
| 1492248 | 11/1977 | United Kingdom. | |
| 1520596 | 8/1978 | United Kingdom. | |
| 2009439 | 6/1979 | United Kingdom. | |

Primary Examiner—John K. Corbin
Assistant Examiner—Rodney B. Borernick
Attorney, Agent, or Firm—Fleit & Jacobson

[57] ABSTRACT

In an optical fibre switch it is important that the ends of the fibres are very accurately aligned after the switching operation so that the minimum amount of light is lost in the switch. This is achieved by mounting an optical fibre in each of the corners of, for example an accurately formed square hole, and having a moveable fibre which can be moved into each corner and which is accurately aligned with one of the other fibres by the sides of the corner itself. Optical switches are used for transmitting light from a light source to one of several different locations. Typical uses are the transmission of data, telecommunications and similar signal transmission systems.

6 Claims, 11 Drawing Figures

OPTICAL FIBRE SWITCHES

This invention relates to optical fibre switches.

When it is desired to transmit light through an optical fibre to one of several different locations a switch is normally interposed between the optical fibre which is connected to the light source, and several other optical fibres, the switch being adapted to direct the light into one of the several other optical fibres, each leading to a different location.

Various types of switches are used, but in each case it is important that the minimum amount of light is lost in the switch.

Light can be lost by inaccurate alignment of the optical fibres in the switch and it is an object of the present invention to provide an optical fibre switch with accurate alignment of the optical fibres and a consequent reduction in the light lost in the switch.

According to a feature of the present invention an optical fibre switch for aligning a first optical fibre with one of a plurality of other optical fibres comprises first supporting means adapted to support the first optical fibre such that the end face of the first optical fibre lies in a plane perpendicular to the axis of the optical fibre and second supporting means adapted to support the plurality of other optical fibres such that their end faces lie in substantially the same plane which is also perpendicular to the axis of the plurality of other optical fibres, the first and second supporting means being relatively moveable such that the first optical fibre can be moved into axial alignment with any one of the plurality of other fibres, means being provided for accurately locating the optical fibres when they are in alignment.

The second supporting means may comprise a body assembly having a multi-sided passage formal therethrough.

Preferably the passage has four sides and a square cross-sectional area and the plurality of other optical fibres comprises four fibres.

The end of each of the four optical fibres may be located in a mounting member which is adapted to be located in a corner of the square section passage.

Each mounting member preferably comprises a cylindrical body having an axial hole for the reception of the end of the optical fibre.

The second supporting means is preferably held stationary and the first supporting means is moveable relative thereto.

The first supporting means may also comprise a cylindrical body having an axial hole for the reception of the end of the optical fibre, the cylindrical body being moveable within the square-section passage.

Preferably the cylindrical body is supported by a moveable member located outside the square-section passage, means being provided for supporting and moving the moveable member externally of the body assembly.

Further features of the invention will become apparent from the following description of embodiments of the invention given by way of example only, with reference to the accompanying drawings in which FIG. 1 is an exploded perspective view showing the principal parts of an optical fibre switch according to the invention.

Figure 1:
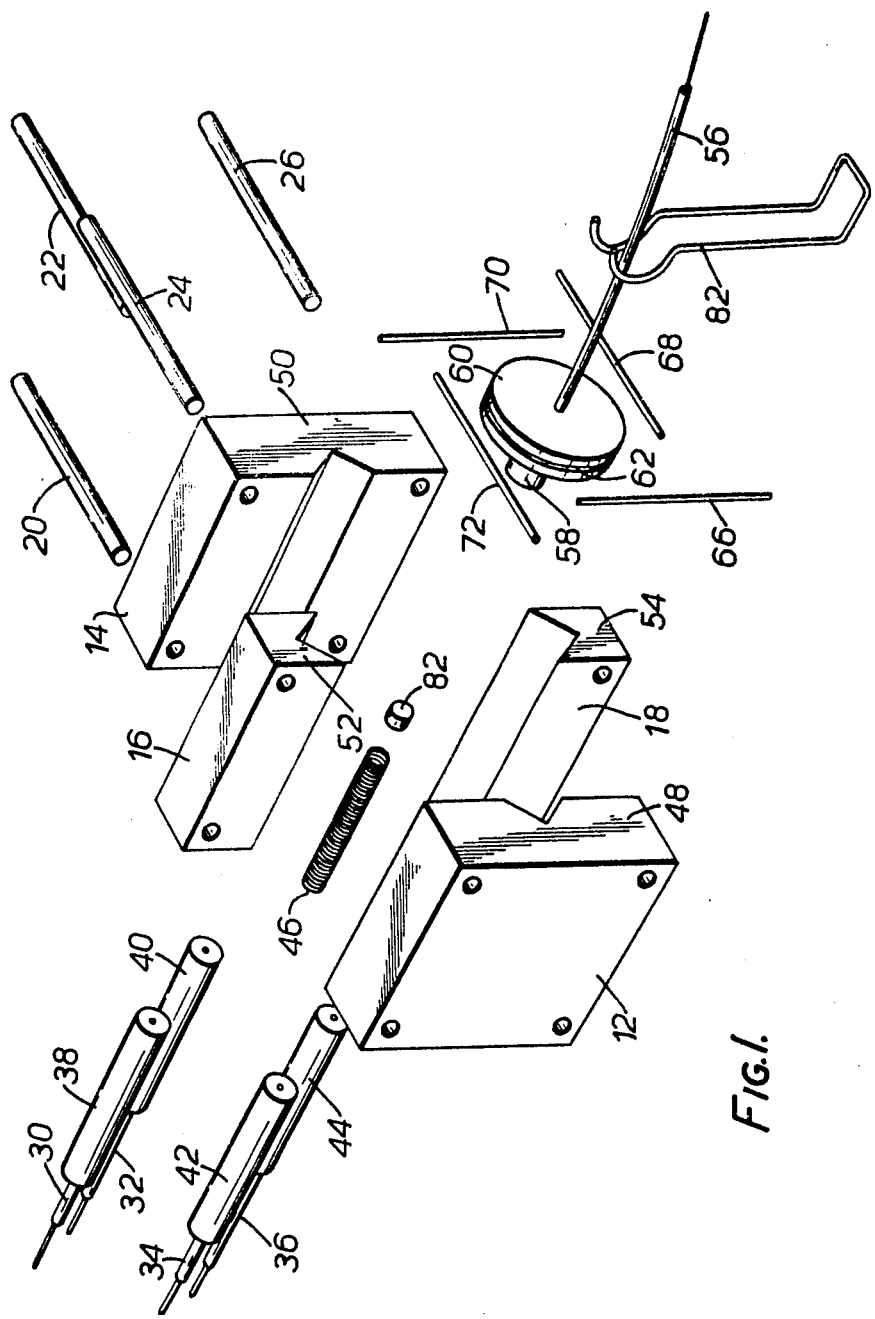

FIG. 1 shows an exploded view of the basic components of an optical switch consisting of four separate parts 12, 14, 16 and 18 which are secured together by dowels 20, 22, 24 and 26. When assembled, an accurate passage 28 of square cross-sectional shape is formed through the assembly as shown in broken lines in FIG. 2.

Alternatively a single body with the precision passage could be used formed in metal or moulded in plastic material.

The ends of four optical fibres 30, 32, 34 or 36 are located in four cylindrical probes 38, 40, 42 and 44, the fibres being cleaved and snapped to leave optically flat end faces and secured in the probes 38 to 44 so that the ends are flush with the ends of the probes.

The probes 38 to 44, all have the same diameter, and each is provided with an accurately positioned axial hole into which one of the optical fibres 30 to 36 are secured by a suitable adhesive or other gripping means.

The four probes 38 to 44 are positioned in the corners of the passage 28 and are held in position by a close coiled spring 46. The probe ends are initially positioned using a plug, the probe ends being pushed against the plug so that the end faces of the probes and the optical fibres lie in a plane perpendicular to the axes of the fibres and perpendicular to the axis of the passage 28. Suitable means for individually adjusting each probe could be provided, for example, using a retaining washer and screw adjusters.

When the body parts 12 to 18 are assembled, the end face of the body assembly consisting of the end faces 48, 50, 52 and 54 of the body parts are lapped flat at right angles to the axis of the passage 28.

A further optical fibre 56 is fixed in a further cylindrical probe 58, this probe having the same outside diameter as the probes 38 to 44. The probe 58 also has an accurately located axial hole to accept the optical fibre 56 whose end face is located flush with the end face of the probe 56. Again the end faces of the probe 58 and the optical fibre 56 are perpendicular to the axis of the fibre.

The optical fibre 56 is buffered or coated so that it is able to withstand a degree of flexing which occurs when the probe 58 is moved. The optical fibres 30 to 36 may also be buffered and coated for compactness and flexibility.

Figure 3:
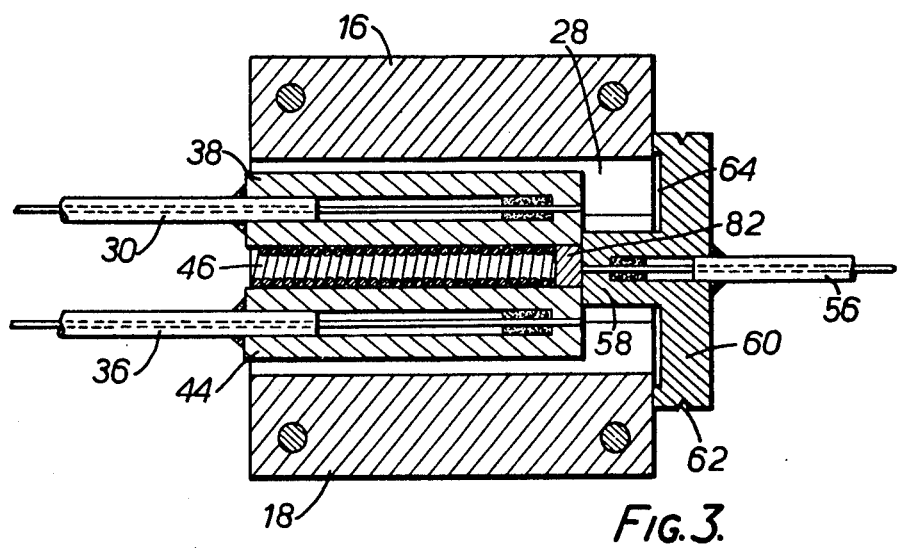
FIG. 3 is a cross-sectional view taken along line 3—3 on FIG. 2.
Figure 4:
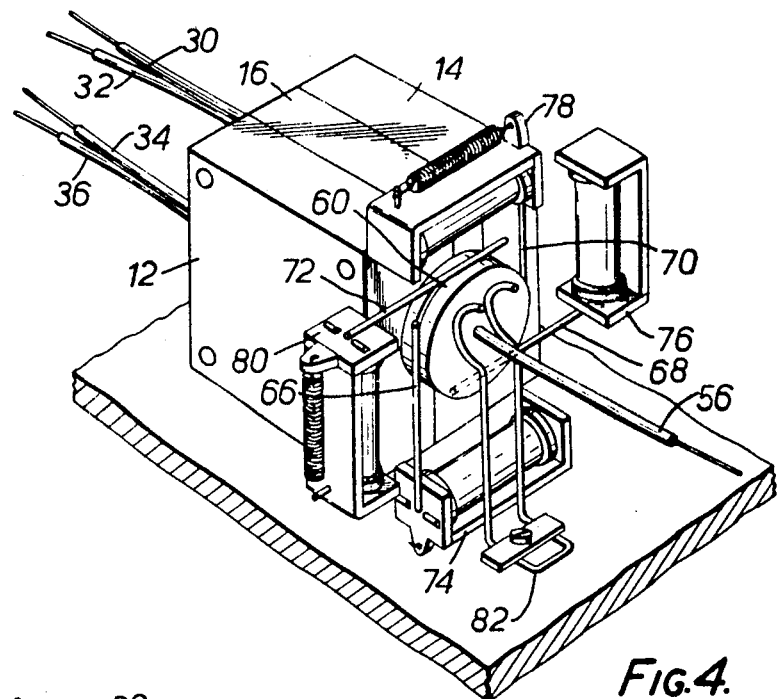
FIG. 4 is a perspective view of the complete assembled optical switch.
Figure 11:
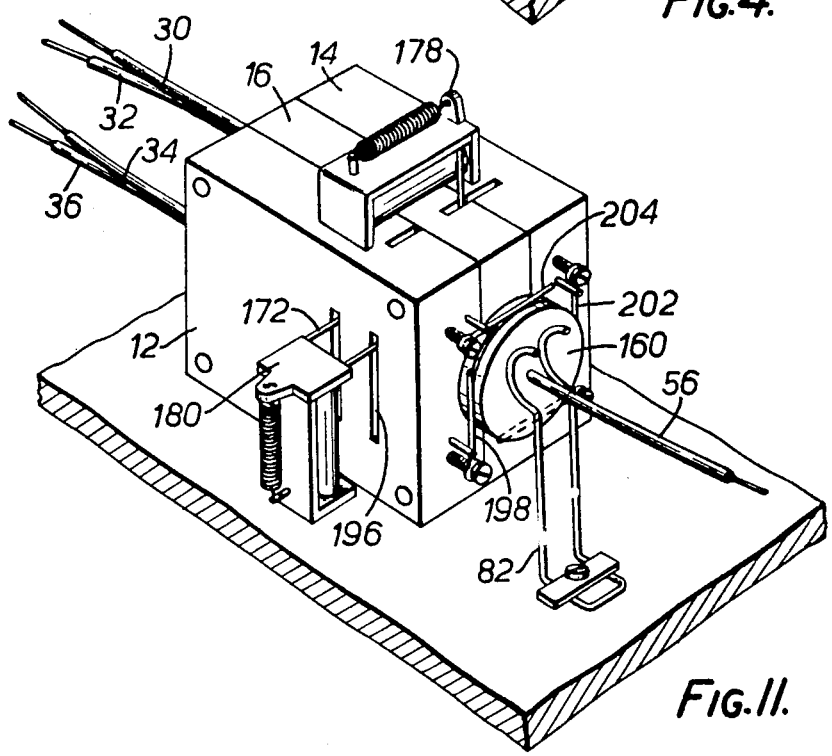
FIG. 11 is a perspective view of the complete assembled switch of FIG. 5.

The probe 58 is formed integrally with or is attached to a circular flange 60, around the periphery of which is formed a vee-groove 62. The probe 58 is located in the end of the passage 28 and the size of the circular flange 60 is such that the flange abuts the end face of the body assembly and completely covers the end of the passage 28. In this position the end face of the further probe 52 will just contact the end faces of the probes 38 to 44 as shown in FIG. 3. The flange 60 can thus move in any direction over the end surface of the body assembly until the further probe 58 touches the side of the passage 28. To reduce friction and any tendency towards rocking and juddering, the contacting surface of the flange 60 is relieved at 64, again as can be seen in FIG. 3.

Four fine steel operating arms 66, 68, 70 and 72 are arranged around the flange 60 and rest tangentially in the vee-groove 62. These operating arms are connected to electrical relays 74, 76, 78 and 80 respectively and by energising these relays the flange 60 and hence the probe 58 can be moved across the end face of the body assembly. The arms 66 to 72 could be moved by any suitable mechanical, pneumatic or hydraulic means instead of the relays shown. A wire spring 82 holds the flange 60 and maintains the flange 60 in contact with the end face of the body assembly.

Since the probes 38, 40, 42 and 44 are located securely in the corners of the passage 28 and the end faces of these probes all lie in the same plane at right angles to the axis of the passage 28, then if the flange 60 is moved so that the further probe 58 is urged into a corner of the passage 28 by one or more of the operating arms 66 to 72, the probe 58 will come to rest in this corner and be in alignment with one of the probes 38 to 44 and transmission of optical signals along the aligned optical fibres can take place. The end face of the further probe 58 is always in substantially the same plane as the end faces of the probes 38 to 44.

Figure 2:
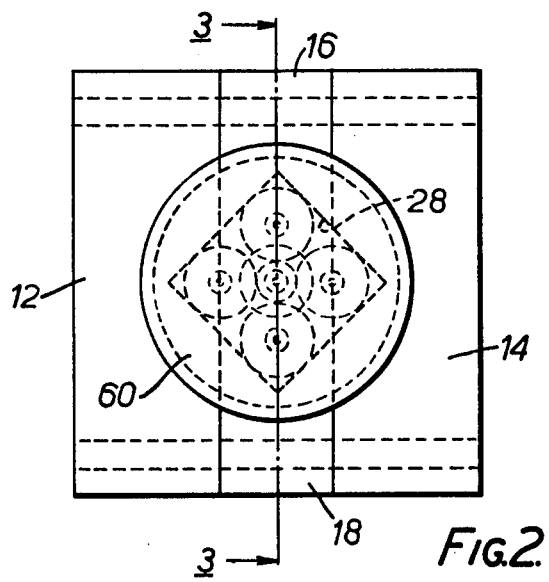
FIG. 2 is an end view of the body of the switch.

When the relays are not operating, the arms 66 to 72 tend to centralize the probe 58 in the passage 28 as shown in FIG. 2.

A plug 82 of suitable cleaning material is located between the probes 38 to 44 at the end of the coil spring 46 so that the switch is self cleaning to a degree, the end face of the probe 58 being cleaned every time it traverses the end of the plug 82. The material of the plug 82 can be a lubricated pith like substance or a cellular polypropylene or similar compound.

Figure 5:
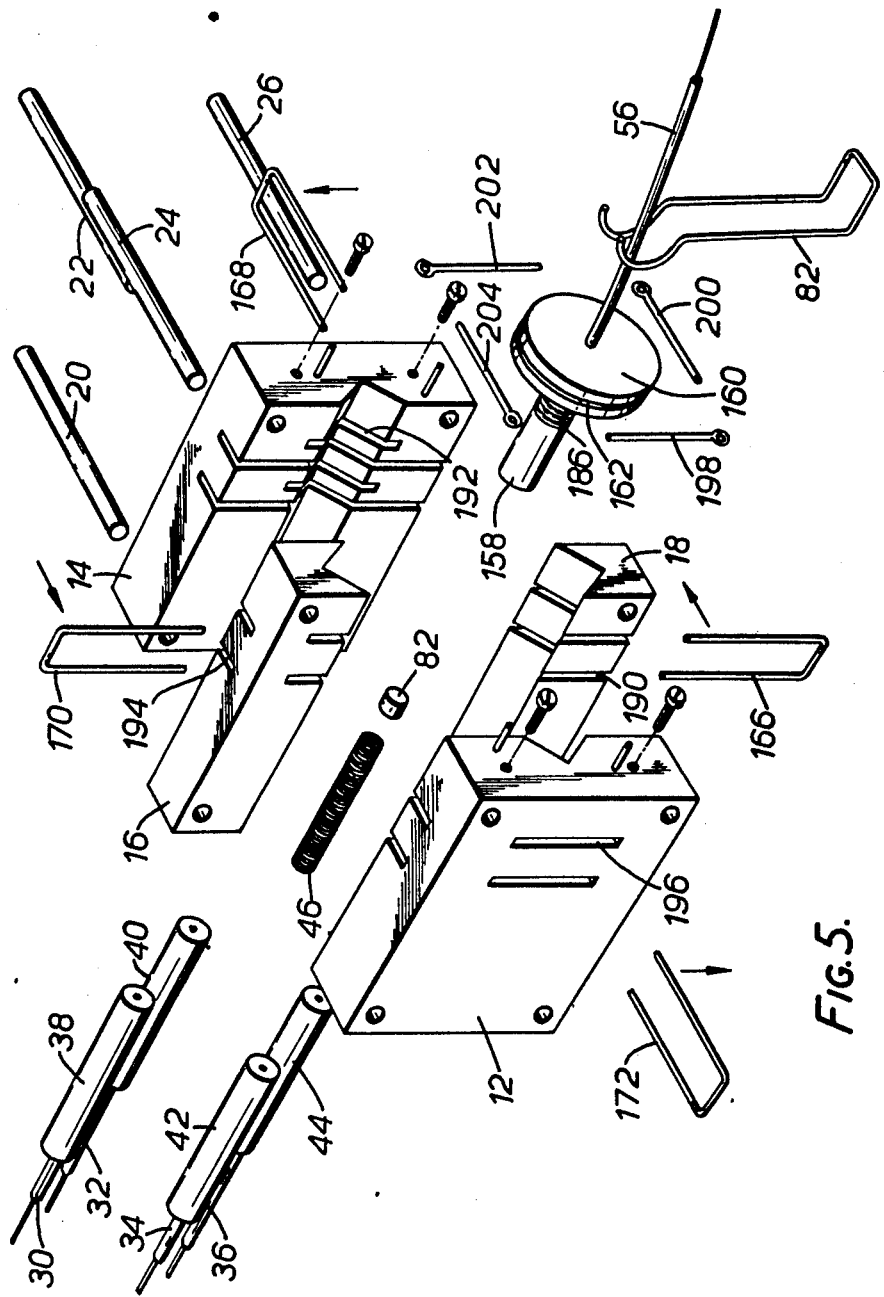
FIG. 5 is an exploded perspective view of another embodiment of an optical switch according to the invention.

Another embodiment of the optical switch is shown as an exploded view in FIG. 5.

Figure 6:
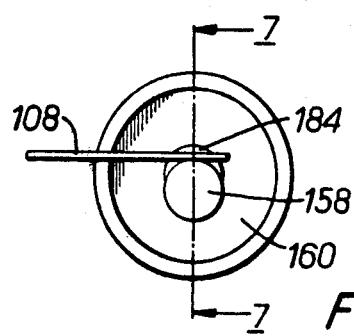
FIG. 6 is an end view of a moveable fibre supporting member employed in the optical switch of FIG. 5.
Figure 10:
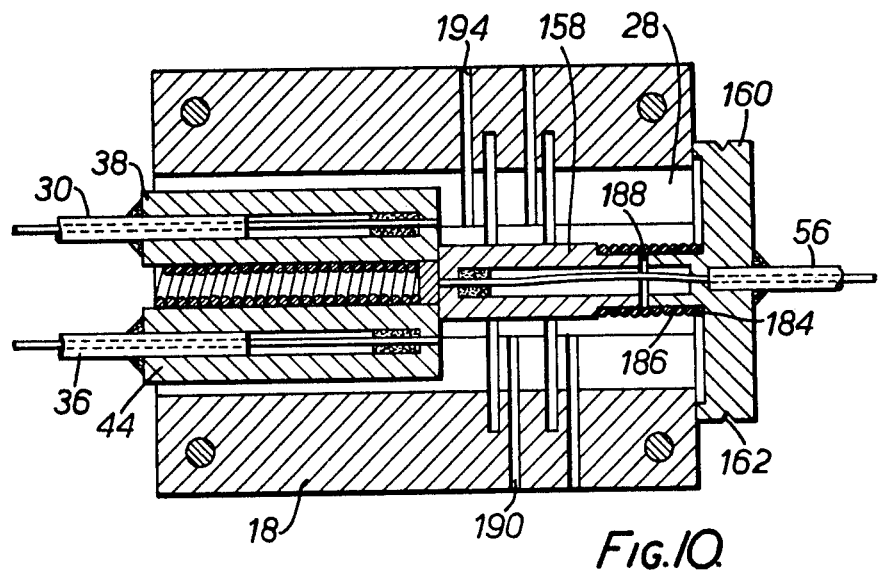
FIG. 10 is a cross-sectional view taken along line 10—10 on FIG. 9.

In this embodiment a further probe 158 is adapted to support the further optical fibre 56, the further probe 158 being axially and radially moveable relative to a flange 160. The flange 160 is provided with an axial projection 184 and the further probe 158 is connected to the projection 184 by a coil spring 186. The projection 184 and the probe 158 are more clearly illustrated in FIGS. 6, 7 and 8. An axial gap 188 (see FIG. 10) is left between the further probe 158 and the projection 184 to permit the probe to be axially moveable towards the projection. The spring 186 also has a universal joint effect so that the probe can move radially whilst its axis remains parallel to the axis of the passage 28.

Figure 7:
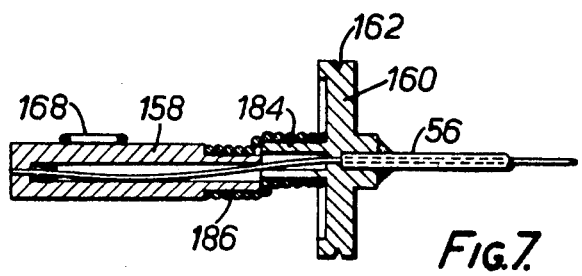
FIG. 7 is a cross-sectional view taken along line 7—7 on FIG. 6.

It will be seen that the end face of the further probe 158 is thus urged into contact with the end faces of the probes 38 to 44 and the plug 82 by the coil spring 186. The projection 184 and the end portion of the probe 158 are bored out to a diameter to permit the optical fibre 56 to readily flex as the probe 158 moves relative to the projection 184. This is best illustrated in FIG. 7.

Figure 8:
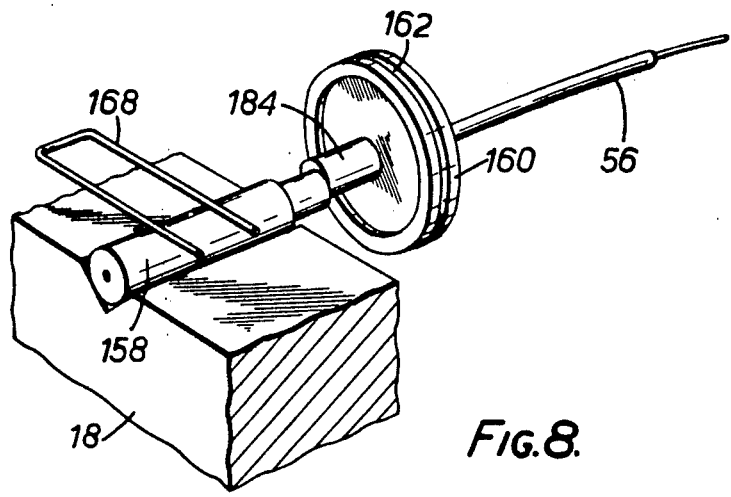
FIG. 8 is a perspective view of the moveable fibre supporting member.
Figure 9:
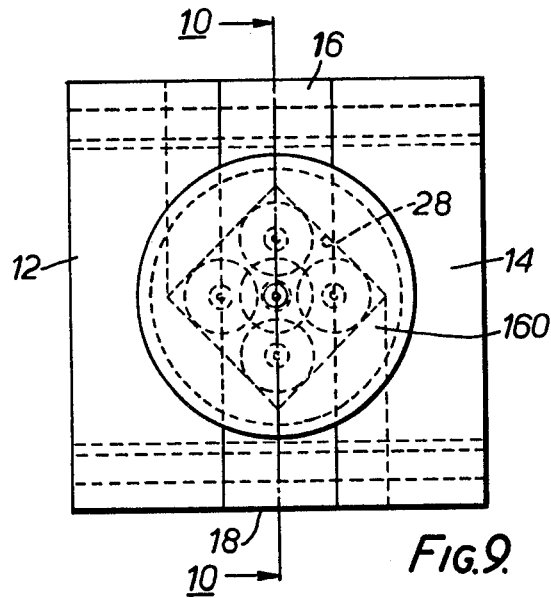
FIG. 9 is an end view of the body of the switch of FIG. 5.

The movement of the probe 158 is effected by forked operating arms 166, 168, 170 and 172 which extend through slots 190, 192, 194 and 196 formed in the body parts 12, 14, 16 and 18 and contact the sides of the probe 158 directly. As before, these arms are operated by relays 174, 176, 178, 180 mounted externally of the body assembly. This is illustrated in FIG. 8, the spring 186 not being shown for clarity.

When none of the relays is operating, the probe 158 is centered by the forked operating arms 166 to 172 assisted by light wire springs 198, 200, 202 and 204 secured to the end face of the body assembly which bear tangentially on to a vee-groove 162 formed in the periphery of the flange 160.

The forked operating arms 166 to 172 hold and ensure that the probe 158 locates in a corner of the square section passage 28; also a light residual end force is provided by the action of the coil spring 186 to keep the opposed probe faces in contact with each other and therefore in the same plane, also the action of the flange 160 does not directly influence the location of the probe 158 due to the universal joint effect of the coil spring 186.

To prevent any possibility of the flange 160 rotating, the wire springs 198 to 204 can be located in holes or slots formed in the flange 160 instead of or as well as the vee-groove 162.

Various modifications can be made to the optical switch whilst remaining within the scope of the present invention. For example the passage could have more sides than the four illustrated to permit more probes to be located in the body assembly. In such a case however the angle of the corner between adjacent sides of the passage could not be too large, otherwise the accuracy of location would be lost.

What is claimed is:

1. An optical fibre switch for aligning a first optical fibre with one of a plurality of second optical fibres, comprising a first cylinder having an axial hole for securement to the end of said first fibre, and a plurality of second cylinders of equal diameter each having an axial hole for securement to the end of one of said second optical fibres, a body having a multi-sided passage formed therethrough and defining an axis thereof, each of said second cylinders being secured inside said multi-sided passage so that each of said second cylinders is located by two adjacent sides of the multi-sided passage, the end faces of said plurality of second cylinders being in a plane perpendicular to the axis of said multi-sided passage, and means for moving said first cylinder relative to said second cylinders with its end face in said plane, the diameter of said first cylinder being equal to the diameter of said second cylinders, said first optical fibre being aligned with a given one of said second optical fibres when said first cylinder contacts said two adjacent sides of said multi-sided passage locating one of said second cylinders secured to the end of said given one of said second optical fibres.

2. An optical fibre switch as claimed in claim 1 wherein said multi-sided passage has four sides and a square cross-sectional area.

3. An optical fibre switch as claimed in claim 2 wherein said plurality of second optical fibres comprises four optical fibres.

4. An optical fibre switch as claimed in claim 3 wherein said plurality of second cylinders comprises four second cylinders, said end of one of each of said four optical fibres being located in one of said four second cylinders, each said second cylinder being located in a corner of the multi-sided passage.

5. An optical fibre switch as claimed in claim 4 wherein said multi-sided passage is held stationary and said first cylinder is moveable relative thereto.

6. An optical fibre switch as claimed in claim 5 comprising a moveable member, said moveable member being located outside said multi-sided passage, said first cylinder being supported by said moveable member, means being provided for supporting and moving said moveable member externally of said body.

* * * * *